US012553455B2

(12) United States Patent
Renzelman et al.

(10) Patent No.: US 12,553,455 B2
(45) Date of Patent: Feb. 17, 2026

(54) WATERWAY AND FLOW STRAIGHTENER FOR A WATER DELIVERY DEVICE

(71) Applicant: Kohler Co., Kohler, WI (US)

(72) Inventors: Brian Douglas Renzelman, Sheboygan, WI (US); Andrew James Stokes, Mazomanie, WI (US); Joel Aldebaran Salazar Elorza, Monterrey (MX); Gary Clarke, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 187 days.

(21) Appl. No.: 18/352,829

(22) Filed: Jul. 14, 2023

(65) Prior Publication Data

US 2024/0044347 A1 Feb. 8, 2024

Related U.S. Application Data

(60) Provisional application No. 63/396,029, filed on Aug. 8, 2022.

(51) Int. Cl.
*F15D 1/06* (2006.01)
*E03C 1/04* (2006.01)

(52) U.S. Cl.
CPC .............. *F15D 1/06* (2013.01); *E03C 1/0404* (2013.01); *Y10T 137/9464* (2015.04)

(58) Field of Classification Search
CPC ....... E03C 1/0404; E03C 1/0405; B05D 1/06; Y10T 137/9464
USPC .......................................................... 137/801
See application file for complete search history.

(56) References Cited

U.S. PATENT DOCUMENTS

| | | | | |
|---|---|---|---|---|
| D601,668 S | 10/2009 | Williams | | |
| D667,932 S | 9/2012 | Kulig et al. | | |
| 8,418,937 B2 | 4/2013 | Staedtler | | |
| 8,561,922 B2 | 10/2013 | Staedtler | | |
| 8,561,923 B2 | 10/2013 | Staedtler | | |
| 8,573,258 B2 * | 11/2013 | Lin | ........................ | E03C 1/0404 239/592 |
| 8,672,244 B2 | 3/2014 | Wildfang | | |
| D708,710 S | 7/2014 | Yu | | |
| D724,184 S | 3/2015 | Cahill et al. | | |
| 9,068,328 B2 | 6/2015 | Stadtler | | |
| 9,353,509 B2 | 5/2016 | Hart | | |

(Continued)

FOREIGN PATENT DOCUMENTS

CN 113083531 A * 7/2021 ............... B05B 1/04

OTHER PUBLICATIONS

CN113083531a, Fan, Machine translation (Year: 2021).*

(Continued)

*Primary Examiner* — Daphne M Barry
(74) *Attorney, Agent, or Firm* — Foley & Lardner LLP

(57) ABSTRACT

A waterway for a fluid delivery device includes a body, an inlet passage, a continuous header passage, a connector passage, a chamber, and a plurality of ports. The inlet passage is formed in the body and configured to receive a supply of water. The continuous header passage is formed in the body as a loop with elongated side passages. The connector passage is formed in the body and fluidly interconnects the inlet passage and the elongated side passages. The chamber is formed in the body in spaced relation to the elongated side passages. The plurality of ports is formed in the body and extends between the elongated side passages and the chamber.

20 Claims, 16 Drawing Sheets

(56) References Cited

U.S. PATENT DOCUMENTS

| | | | | |
|---|---|---|---|---|
| 9,428,892 | B2 | 8/2016 | Stadtler | |
| 9,534,362 | B2 | 1/2017 | Stadtler | |
| 9,556,598 | B2 | 1/2017 | Stadtler | |
| 9,663,929 | B2 | 5/2017 | Loerch | |
| 9,856,635 | B1 | 1/2018 | Liu | |
| 10,400,429 | B2 * | 9/2019 | Eads | E03C 1/0404 |
| D884,127 | S | 5/2020 | Massaud | |
| D895,070 | S | 9/2020 | Zhang | |
| 10,955,059 | B2 | 3/2021 | Rosko et al. | |
| 11,186,973 | B2 | 11/2021 | Rosko et al. | |
| 11,214,947 | B2 | 1/2022 | Rosko et al. | |
| 11,248,368 | B2 | 2/2022 | Rosko et al. | |
| D967,339 | S | 10/2022 | Zhang | |
| D1,077,143 | S | 5/2025 | Chen | |
| 2005/0086733 | A1 * | 4/2005 | Li | E04H 4/14<br>4/507 |
| 2016/0032570 | A1 | 2/2016 | Wang et al. | |
| 2020/0157788 | A1 | 5/2020 | Wollmer et al. | |
| 2020/0208383 | A1 * | 7/2020 | Rosko | E03C 1/0404 |
| 2021/0062481 | A1 | 3/2021 | Buescher et al. | |
| 2022/0170253 | A1 * | 6/2022 | Veurink | E03C 1/0409 |
| 2024/0044347 | A1 | 2/2024 | Renzelman et al. | |

OTHER PUBLICATIONS

Becola Bathroom Sink Waterfall Faucet, first available Aug. 27, 2020[online], [site visited Dec. 4, 2025]. Available from internet, URL: https://WWW.amazon.com/dp/B08GPYF86Q (Year: 2020).

Luxury White Gold Bathroom Mixer Tap, first available Nov. 16, 2024[online], [site visited Dec. 3, 2025]. Available from internet, URL: <https://WWW.amazon.com/Luxury-Bathroom-Faucet-Single-SLT194-BG/dp/BODN9R8PS2?th=1 > (Year: 2024).

* cited by examiner

WATERWAY AND FLOW STRAIGHTENER FOR A WATER DELIVERY DEVICE

CROSS REFERENCE TO RELATED PATENT APPLICATIONS

This application claims the benefit of and priority to U.S. Provisional Patent Application No. 63/396,029, filed Aug. 8, 2022, the entire disclosure of which is incorporated by reference herein.

BACKGROUND

The present invention relates generally to the field of water delivery devices, such as faucets. In particular, the present disclosure relates to a waterway assembly for creating a desired flow pattern.

SUMMARY

According to an exemplary embodiment, a waterway for a fluid delivery device includes a body, an inlet passage, a continuous header passage, a connector passage, a chamber, and a plurality of ports. The inlet passage is formed in the body and configured to receive a supply of water. The continuous header passage is formed in the body as a loop with elongated side passages. The connector passage is formed in the body and fluidly interconnects the inlet passage and the elongated side passages. The chamber is formed in the body in spaced relation to the elongated side passages. The plurality of ports is formed in the body and extends between the elongated side passages and the chamber.

According to another exemplary embodiment, a water delivery device includes a waterway and a stream straightener. The waterway includes a body, an inlet passage, a continuous header passage, a connector passage, a chamber, and a plurality of ports. The inlet passage is formed in the body and configured to receive a supply of water. The continuous header passage is formed in the body as a loop with elongated side passages. The connector passage is formed in the body and fluidly interconnects the inlet passage and the elongated side passages. The chamber is formed in the body in spaced relation to the elongated side passages. The plurality of ports is formed in the body and extends between the elongated side passages and the chamber.

According to another exemplary embodiment, a faucet assembly includes a faucet, a body, a waterway assembly, and a stream straightener. The waterway assembly includes a first waterway configured to direct fluid in at least a first flow direction. The waterway assembly also includes a second waterway in an elongated oval or ellipse configuration that is configured to direct fluid in at least a second flow direction and is configured to provide a uniform fluid distribution and pressure within the second waterway. The stream straightener is coupled to the body and configured to direct fluid flow to create a flow pattern.

According to another exemplary embodiment, a faucet includes a waterway and a stream straightener. The waterway is fluidly coupled to the faucet and configured to deliver a flow of water therethrough. The waterway includes a first waterway extending longitudinally through the faucet body, and a second waterway extending along a second portion of the faucet in an elongated oval shape to provide more uniform water distribution and pressure. The second waterway is fluidly coupled to the first waterway by one or more first openings. The stream straightener is fluidly coupled to the second waterway by one or more second openings. The stream straightener is configured to output a flow of water therethrough. The steam straightener includes one or more ribs extending horizontally within and configured to separate the flow of water.

In some embodiments, the stream straightener is removably coupled into an end of the faucet. The stream straightener includes an O-ring peripherally provided relative to a body of the stream straightener. The O-ring is configured to seal an area between the stream straightener and a faucet body.

In some embodiments, the stream straightener includes one or more raised portions and a middle portion. The raised portions are positioned proximate to the ends of the stream straightener. The middle portion is positioned between the raised portions and angularly positioned relative to the raised portions.

According to another exemplary embodiment, an internal waterway for a faucet includes a first waterway and a second waterway. The first waterway extends along a first portion of the faucet in a first direction. The second waterway extends along a second portion of the faucet in a second direction. The second waterway is fluidly coupled to the first waterway by one or more first openings. The second waterway is fluidly coupled to a stream straightener by one or more second openings. The steam straightener includes one or more ribs extending within the steam straightener. The one or more ribs are configured to obstruct a flow of water through the internal waterway.

This summary is illustrative only and is not intended to be in any way limiting. Other aspects, inventive features, and advantages of the devices or processes described herein will become apparent in the detailed description set forth herein, taking in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
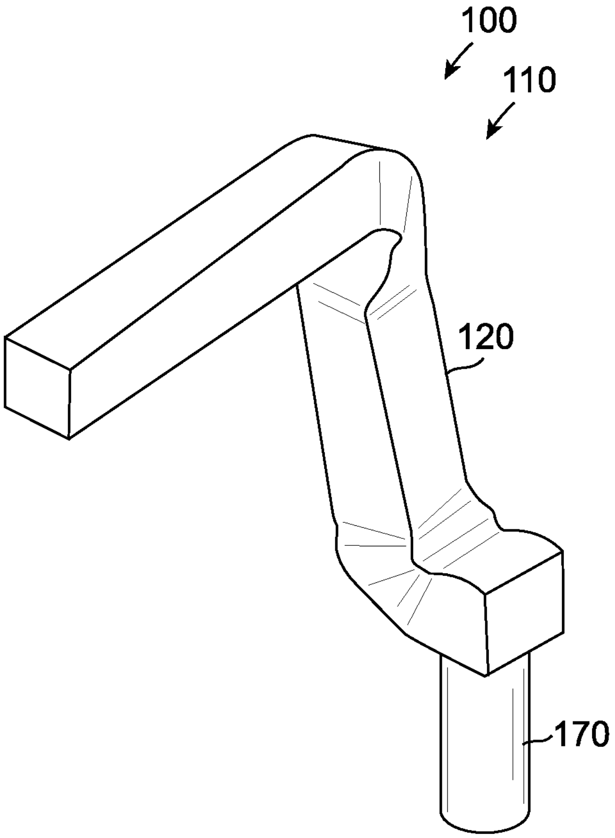
FIG. 1 is a perspective view of a faucet for a faucet assembly, according to an exemplary embodiment.

Before turning to the FIGURES, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, an exemplary embodiment of a faucet assembly includes a faucet, a waterway and a stream straightener. The faucet assembly is configured for use in a bathing environment, although alternative environments are contemplated (e.g., kitchen, etc.). In some embodiments, the faucet assembly is manufactured using 3D printing. In other embodiments, the faucet assembly may be manufactured using other manufacturing processes such as but not limited to machining brass or injection molding plastic. The waterway is fluidly coupled to the faucet and configured to deliver a flow of water therethrough. The waterway includes a first waterway extending longitudinally through the faucet body, and a second waterway extending along a second portion of the faucet in an elongated oval shape to provide more uniform water distribution and pressure. The second waterway is fluidly coupled to the first waterway by one or more first openings.

The stream straightener is fluidly coupled to the second waterway by one or more second openings. The stream straightener is configured to output a flow of water therethrough. The stream straightener includes a plurality of parallel ribs configured to discharge a stream of water. The steam straightener includes one or more protrusions extending horizontally within and configured to separate the flow of water. The one or more protrusions are configured to obstruct a flow of water through the stream straightener. The stream straightener is removably coupled into an end of the faucet. In other embodiments, the stream straightener may be formed together with the second waterway. The stream straightener includes an O-ring peripherally provided relative to a body of the stream straightener. The O-ring is configured to seal an area between the stream straightener and a faucet body. The stream straightener includes one or more raised portions and a middle portion. The raised portions are positioned proximate to the ends of the stream straightener. The middle portion is positioned between the raised portions and angularly positioned relative to the raised portions. In other embodiments, the stream straightener may not include one or more raised portions and a middle portion.

The water may flow out of the stream straightener to create a unique water flow pattern. In some embodiments, the water flow pattern is a linear, grid pattern, where ends of the water flow intersect one another distal a stream straightener outlet.

Another exemplary embodiment may include a flow delivery device. The flow delivery device may include a showerhead/hand shower or faucet, a waterway, and a stream straightener. The flow delivery device may be configured for use in a bathing environment. The flow delivery device is substantially similar to the faucet assembly as described throughout the application.

Figure 2:
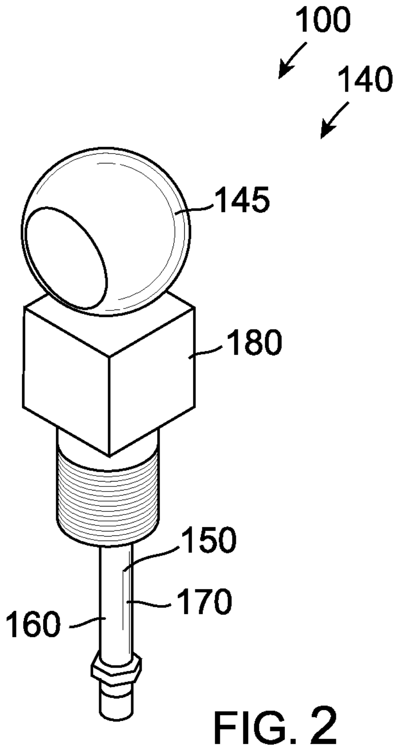
FIG. 2 is a perspective view of handle assembly for a faucet assembly, according to an exemplary embodiment.

Referring to FIGS. 1 and 2, a faucet assembly 100 includes a faucet 110 that is shown according to various exemplary embodiments. The faucet 110 may be configured for use in bathing and/or kitchen environments, where the faucet 110 may provide a flow of water therethrough. The faucet 110 may be manufactured via 3D printing. That is, at least some of the faucet components (e.g., body 120, waterway assembly 210, etc.) may be manufactured from 3D printed plastic (e.g., ABS, PLA, etc.). In other embodiments, the entire faucet 110 may be manufactured from 3D printed plastic. According to some embodiments, at least some of the faucet components, such as the stream straightener, may be formed by 3D printing from a material having high heat deflection and low water absorption properties and may be certified by the National Sanitation Foundation (NSF). In other embodiments, at least some of the faucet components (e.g., body 120, waterway assembly 210, etc.) may be manufactured from machined brass or other suitable materials. In other embodiments, at least some of the faucet components (e.g., body 120, waterway assembly 210, etc.) may be manufactured from injection molded plastic. After manufacturing, the faucet 110 may include an outer coating for protection (e.g., powder coating, etc.). The faucet 110 may include a body 120. The body 120 may form a shell relative to internal components of the faucet 110. The body

120 may form a prismatic structure around the internal components of the faucet 110. In other embodiments, the body 120 may form any geometrical structure around internal components of the faucet 110. In other embodiments, the body 120 may form a cylindrical structure around the internal components of the faucet 110.

Referring specifically to FIG. 2, the faucet assembly 100 may include a handle assembly 140. The handle assembly 140 may be a separate component to the faucet 110, where the handle assembly 140 may be positioned distal the faucet 110. In other embodiments, the handle assembly 140 may be integrated into the faucet 110. The handle assembly 140 may be fluidly coupled to the faucet 110. That is, the handle assembly 140 may be configured to control a flow of water delivered to the faucet 100. The handle assembly 140 may include one or more water inlets, shown as hot water line 150 and cold water line 160. Although not shown, the water lines 150, 160 may be fluidly coupled to a mixing chamber 224, where water is mixed to create water having a substantially homogenous temperature. By way of example, the hot water line 150 may deliver a flow of hot water to the mixing chamber 224, and the cold water line 160 may deliver a flow of cold water to the mixing chamber 224. The mixing chamber 224 is further fluidly coupled to a third water line, shown as mixed water line 170. The mixed water line 170 may be an outlet water line from the mixing chamber 224 to the faucet 110. The handle assembly 140 may include a handle 145, where the handle 145 may be rotatably coupled (e.g., clockwise, counterclockwise, etc.) to a handle base 180. The handle 145 may be rotated relative to the base to selectively actuate and control a temperature of the water. According to an exemplary embodiment, the handle 145 may be initially rotated to actuate a flow of water, then the handle 145 may be further rotated to choose between cold water, hot water, or a combination thereof.

Referring to FIGS. 1 and 2, the faucet 110 may be fluidly coupled to the handle assembly 140 via the mixed water line 170. The mixed water line 170 may be configured to deliver a flow of water from the handle assembly 140 to the faucet 110. In other embodiments, the faucet 110 may include an internal mixing chamber 224, where the faucet 110 is directly fluidly coupled to the hot water line 150 and the cold water line 160. The handle assembly 140 may include a flow regulator configured to manage a water pressure delivered to the faucet 110 via the mixed water line 170. The flow regulator may be repositionable to regulate a flow pressure. In one embodiment, the flow regulator may have a range of 0.5 to 3.5 gallons per minute (GPM). According to an exemplary embodiment, the flow regulator may output a water pressure at or around 1.2 (GPM).

Figure 3:
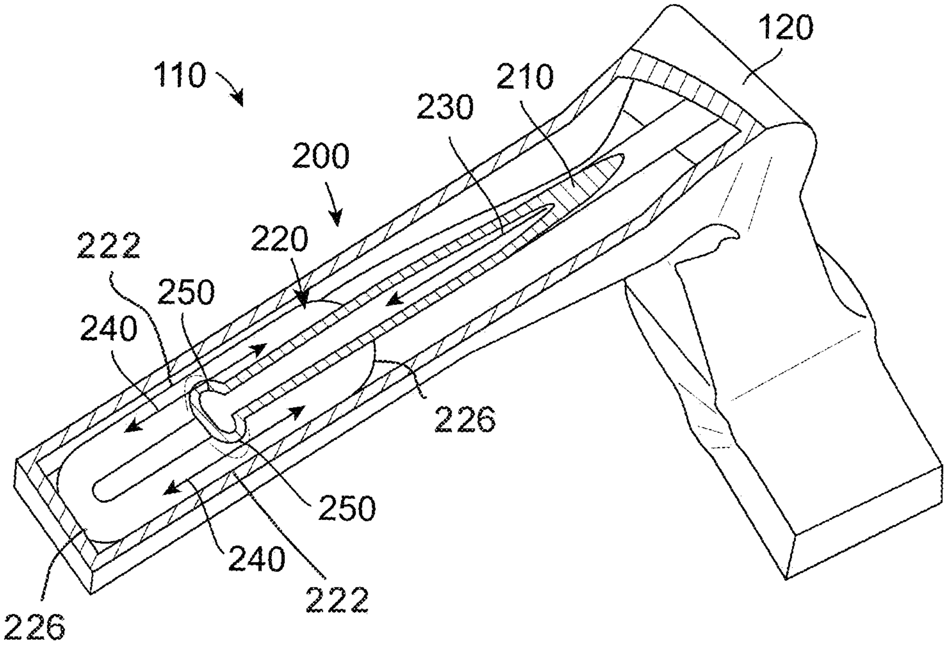
FIG. 3 is a detailed view of the faucet of FIG. 1, showing an internal waterway, according to an exemplary embodiment.

Referring now to FIG. 3, the faucet 110 may include a waterway assembly 200. The waterway assembly 200 may extend through at least a portion of the body 120. That is, the body 120 may encapsulate at least a portion of the waterway assembly 200. The waterway assembly 200 may be a hollow tubing configured to transfer a flow of water within. The waterway assembly 200 may be fluidly coupled to the mixed water line 170, where a flow of mixed water may be transferred within the waterway assembly 200. In other embodiments, the waterway assembly 200 may be further fluidly coupled to at least one of the hot water line 150 and the cold water line 160. The waterway assembly 200 may be provided within an entirety of the body 120 and may include one or more waterway portions, shown as first waterway 210 and second waterway 220. The first waterway 210 may also be referred to as an inlet passage 210 and, and the second waterway 220 may also be referred to as a continuous header passage 220. The first waterway 210 may be provided relative to a respective first portion of the body 120. According to an exemplary embodiment, the first waterway 210 may be provided within an entirety of the faucet 110 until a faucet outlet. The second waterway 220 may be fluidly coupled to the first waterway 210 proximate the faucet outlet. Additionally or alternatively, the second waterway 220 may be positioned at least partially underneath the first waterway 210. Although a specific arrangement of the waterways 210, 220 have been described, the waterways 210, 220 may be positioned anywhere within the faucet 110.

The first waterway 210 may include a first flow direction, shown as first direction 230. The first direction 230 may represent the flow of water from the mixed water line 170 to the second waterway 220. In other embodiments, the first waterway 210 may include multiple flow directions. In some embodiments, the first waterway 210 may be formed in a body of the waterway assembly 200 and may be configured to receive a supply of water. The body of the waterway assembly 200 may be 3D printed, machined from brass, injection molded, or made from other materials using suitable methods. The second waterway 220 may include a second flow direction, shown as second direction 240. The second direction 240 may represent the flow of water from the first waterway 210 to the faucet outlet. The second waterway 220 may be configured as an elongated oval or ellipse configuration (e.g., racetrack, etc.), where the second direction 240 extends along either direction of the second waterway 220. In other embodiments, the second waterway 220 may include a single flow direction. In some embodiments, the second waterway 220 may be formed in the body of the waterway assembly 200 as a loop with elongated side passages 222. The elongated side passages 222 may be two parallel side passages with two semicircular end passages 226 at opposite ends of the two parallel elongated side passages 222. As can be appreciated, the second waterway 220 may provide more uniform water distribution and pressure by directing water in opposing directions within the second waterway 220.

The water may flow from the first waterway 210 to the second waterway 220 via one or more openings, shown as first openings 250. The first openings 250 may also be referred to as connector passages 250. The first openings 250 may permit water transfer between the first waterway 210 and the second waterway 220. According to an exemplary embodiment, the first openings 250 may include two first openings 250 provided opposite one another. In other embodiments, the first openings 250 may include more or less than two first openings 250. The first openings 250 may be positioned substantially adjacent to a midpoint of the second waterway 220, where the water flows into the second waterway 220 proximate a midpoint of the second waterway 220. In some embodiments, the first openings 250 may be formed in the body of the waterway assembly 200 and may fluidly interconnect the first waterway 210 and the elongated side passages 222. The first opening 250 may include a first passage that extends between the inlet passage and a central region of one side of the loop, and a second passage extending between the inlet passage and a central region of an opposite side of the loop. As can be appreciated, the splitting of water flow from the first waterway 210 to the second waterway 220 may more evenly distribute the water flow and/or slow down a speed of the water flow.

Figure 4:
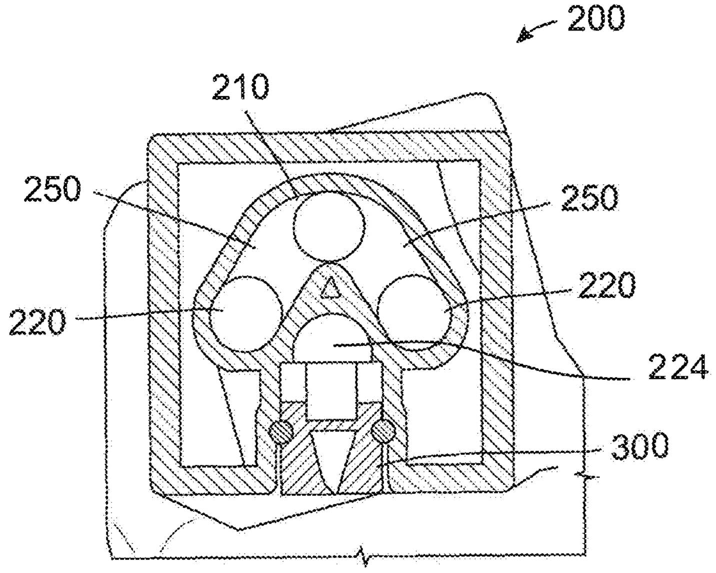
FIG. 4 is a detailed rear view of the internal waterway of FIG. 3, according to an exemplary embodiment.

Referring now to FIG. 4, the first openings 250 permit passage of a flow of water from the first waterway 210 to the second waterway 220. The first openings 250 may be substantially equal or equal to a size of the first waterway 210 and the second waterway 220. In other embodiments, the first openings 250 may be larger or smaller than the size of the first waterway 210 and the second waterway 220. As shown in FIG. 4, water flows substantially downward from the first waterway 210 to the second waterway 220. In other embodiments, the water may flow substantially horizontal or vertical from the first waterway 210 to the second waterway 220.

Figure 5:
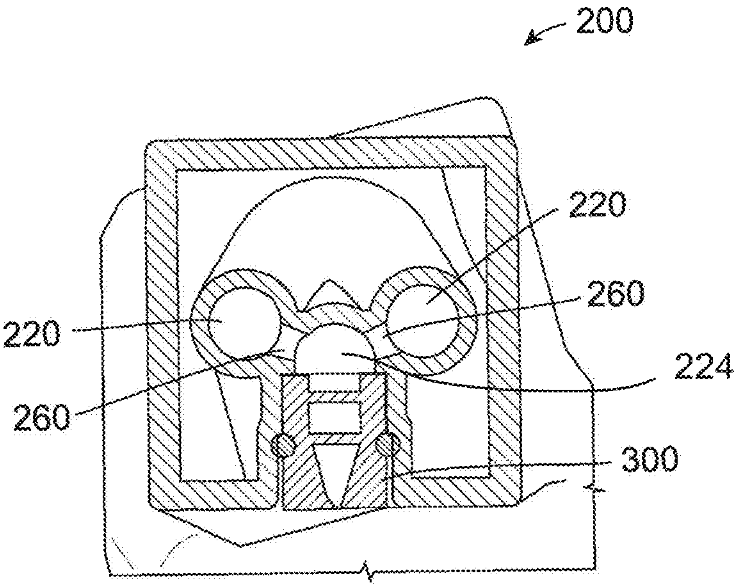
FIG. 5 is a detailed front view of the internal waterway of FIG. 3, according to an exemplary embodiment.
Figure 6:
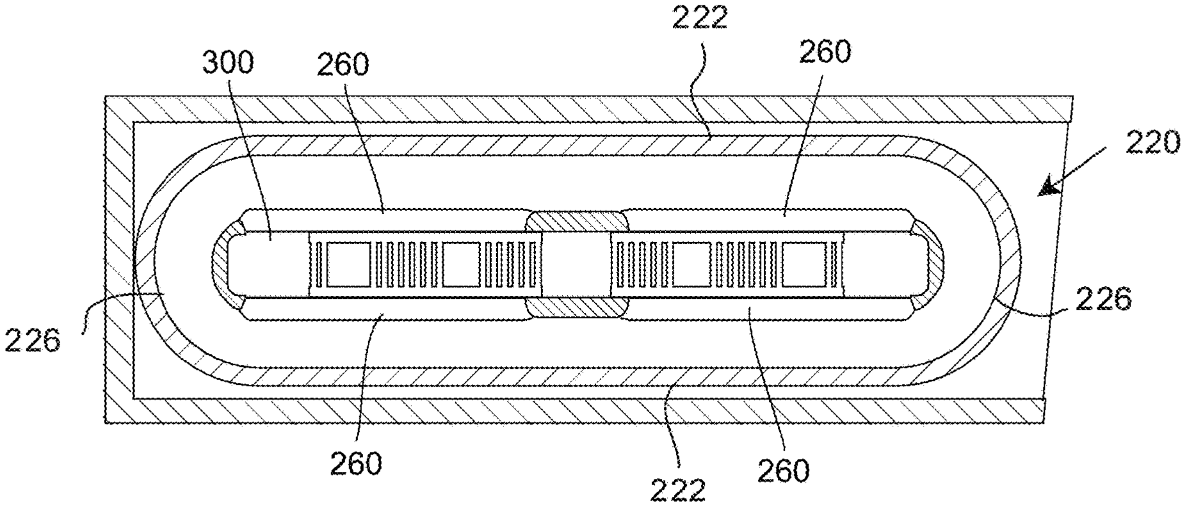
FIG. 6 is a bottom view of the internal waterway of FIG. 3, according to an exemplary embodiment.

Referring now to FIGS. 5 and 6, the water may flow from the second waterway 220 to the stream straightener 300 via one or more openings, shown as second openings 260. The second openings 260 may also be referred to as a plurality of ports 260. According to an exemplary embodiment, the second openings 260 may include four second openings 260. In such an embodiment, two of the second openings 260 may be positioned on a first side of the second waterway 220, and the other two of the second openings 260 may be positioned on a second side of the second waterway 220, where the first side is opposite the second side. In other embodiments, all four second openings 260 may be linearly positioned relative to one another. The second openings 260 may be positioned equidistant to the first openings 250 to permit substantially equal water flow through each of the second openings 260. In some embodiments, water may flow through the second openings 260 into a chamber 224 formed in the body of the waterway assembly 200 in spaced relation to the elongated side passages 222 before flowing through the stream straightener 300. The chamber 224 may be spaced equidistantly between the elongated side passages 222. Additionally or alternatively, the second openings 260 may be formed in the body of the waterway assembly 200 and extend between the elongated side passages 222 and the chamber 224. Additionally or alternatively, the second openings 260 may include four elongated ports symmetrically arranged between the elongated side passages 222 and the chamber 224.

Figure 7:
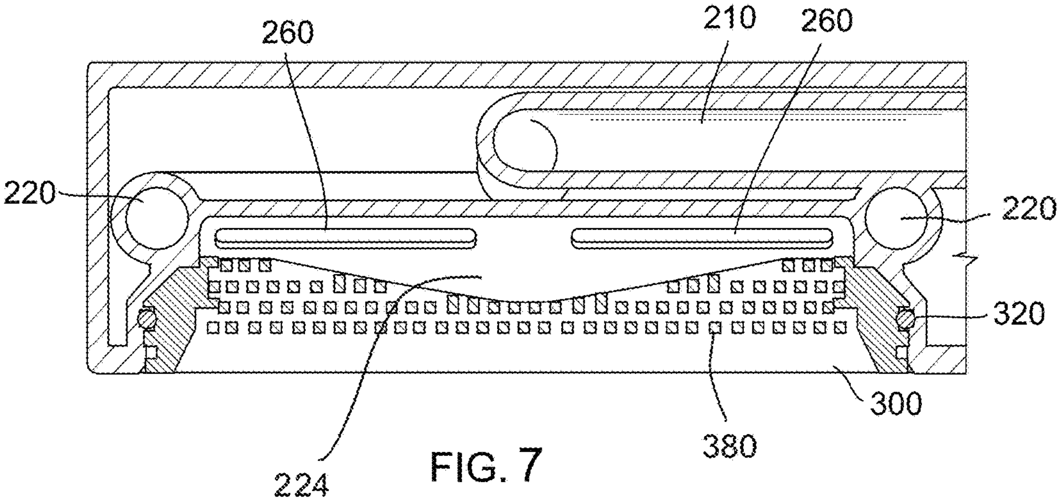
FIG. 7 is a detailed side view of the internal waterway of FIG. 3, according to an exemplary embodiment.

Referring now to FIG. 7, the stream straightener 300 may be at least partially received within the body 120. That is, the stream straightener 300 may be coupled to, or otherwise received within, the body 120. In other embodiments, the stream straightener 300 may be integrally manufactured within the body 120, where the body 120 and the stream straightener 300 form a unitary component. In some embodiments, the stream straightener 300 may include a plurality of parallel ribs 380 formed in the body of the waterway assembly 200 and fluidly communicating with the chamber 224 and configured to discharge a stream of water from the faucet 110. In other embodiments, the stream straightener 300 may include a plurality of parallel ribs 380 releasably coupled to the body of the waterway assembly 200 and fluidly communicating with the chamber 224 and configured to discharge a stream of water from the faucet 110. The stream straightener 300 may include an O-ring 320. The O-ring 320 may be positioned relative to an outer edge of the stream straightener 300. The O-ring 320 may further contact both the stream straightener 300 and an inner portion of the body 120. Accordingly, the O-ring 320 may prevent water from flowing out of the faucet 110 at a location other than the stream straightener 300. In one example, the O-ring 320 may withstand a water pressure up to 125 pounds per square inch (PSI). In another example, the O-ring 32 may withstand a water pressure above 125 PSI. Additionally or alternatively, the O-ring 320 may prevent material (e.g., fluid, physical component, etc.) ingress into the faucet 110. In one example, the O-ring 320 may be positioned within a groove formed relative to an outer portion of the stream straightener 300. In another example, the O-ring 320 may be positioned against a protrusion (e.g., ledge, etc.) of the stream straightener 300, where the protrusion may extend along at least a portion of the stream straightener 300. In other embodiments, the stream straightener 300 may include an alternate sealing component (e.g., gasket, etc.).

Figure 8:
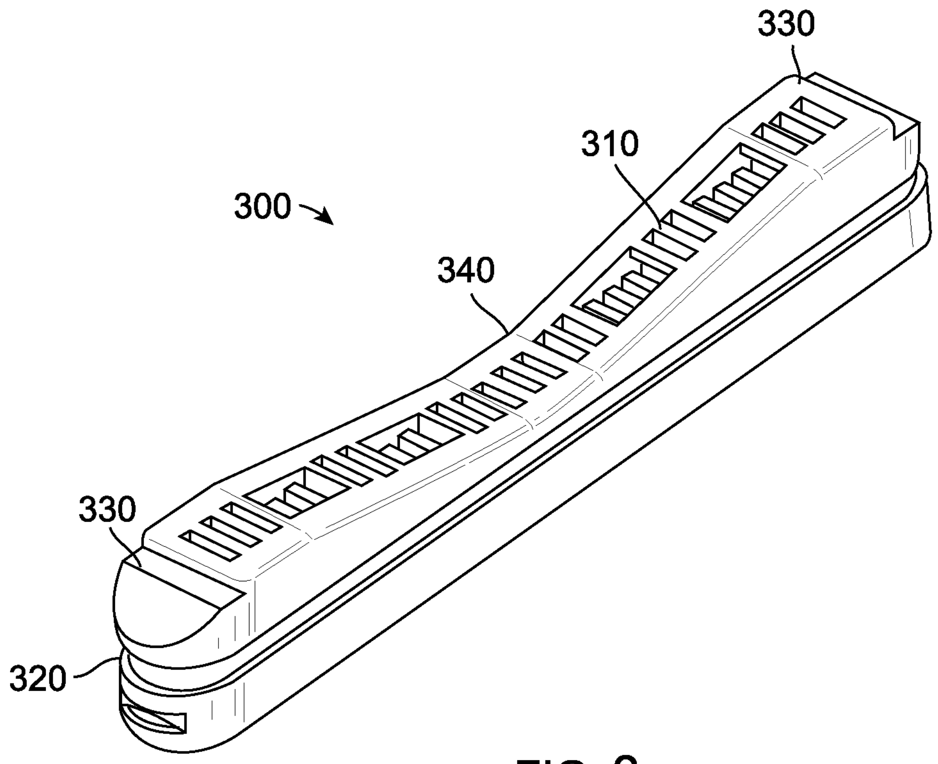
FIG. 8 is a perspective view of a stream straightener for use in the faucet of FIG. 1, according to an exemplary embodiment.

Referring now to FIGS. 7 and 8, the stream straightener 300 may be manufactured out of printed carbon material. According to some embodiments, the stream straightener may be formed by 3D printing from a material having high heat deflection and low water absorption properties and may be certified by the National Sanitation Foundation (NSF). In other embodiments, the stream straightener 300 may be manufactured using alternative methods (e.g., 3D plastic printing, machining, injection molding, extrusion, etc.). The stream straightener 300 may include one or more raised portions, shown as raised portion 330, and one or more concave portions, shown as concave portion 340. The stream straightener 300 may include two raised portions 330, the raised positions 330 positioned proximate ends of the stream straightener 300. The concave portion 340 may be positioned between the raised portions 330. In other embodiments, the stream straightener 300 may not include one or more raised portions. As shown in FIG. 7, the stream straightener 300 may define a height, the height of the stream straightener 300 may be greater at the raised portions 330 than the concave portion 340. In other embodiments, the height of the stream straightener 300 may be greater at the concave portion 340 than the raised portions 330. As can be appreciated, the raised portions 330 and the concave portion 340 may take on a triangular geometry, where the water flow is directed substantially towards a center of the stream straightener 300 by the triangular geometry.

The water may flow into the stream straightener 300 via one or more inlets, shown as stream straightener inlets 310. The stream straightener 300 may include multiple stream straightener inlets 310 positioned along a top surface of the stream straightener 300. The stream straightener inlets 310 may be slotted inlets that extend along a width of the stream straightener 300. The stream straightener inlets 310 may permit water ingress from the second waterway 220 and into the stream straightener 300.

Figure 9:
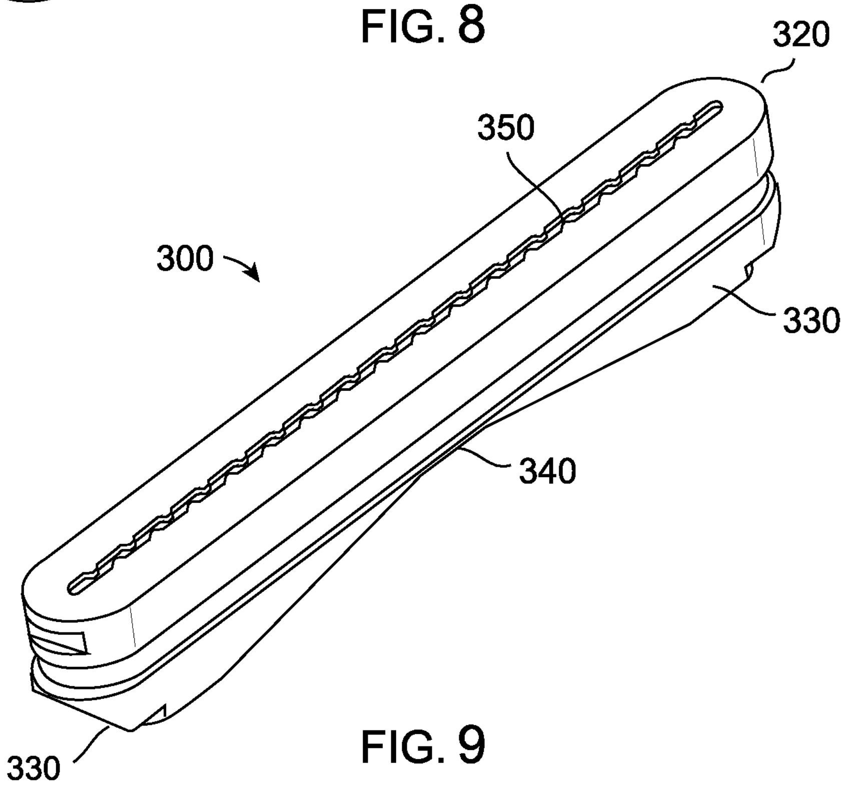
FIG. 9 is another perspective view of the stream straightener of FIG. 8, according to an exemplary embodiment.
Figure 11:
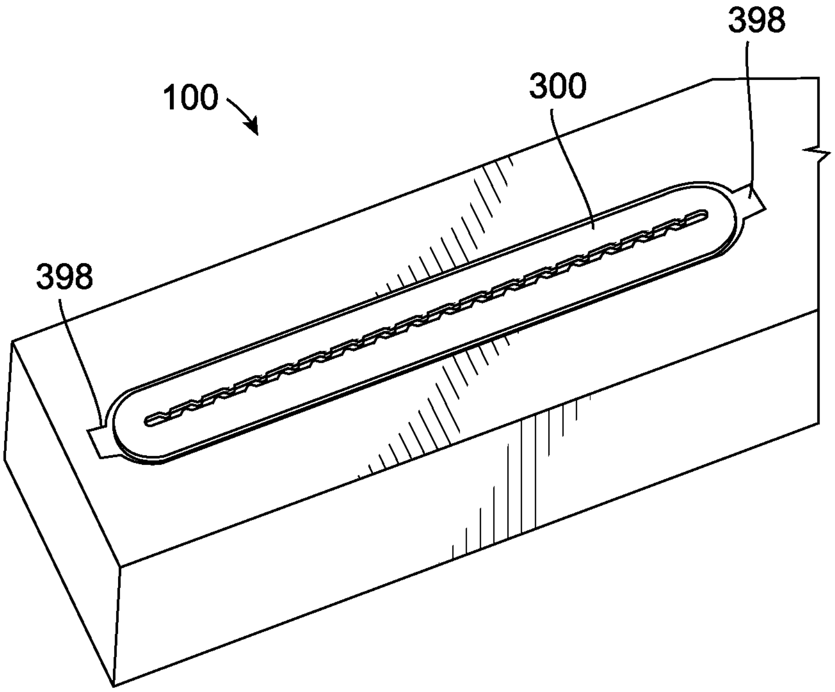
FIG. 11 is a perspective view of a bottom of the faucet of FIG. 1, according to an exemplary embodiment.

Referring now to FIG. 9, the stream straightener 300 may include a stream straightener outlet 350. The stream straightener outlet 350 may be an outlet positioned on a bottom of the stream straightener 300 to permit water flow out of the stream straightener 300. The stream straightener outlet 350 may extend along at least a portion of the bottom surface of the stream straightener 300. In other embodiments, the stream straightener 300 may include multiple stream straightener outlets 350. As shown in FIG. 9, the stream straightener outlet 350 may be a linear profile including one or more teeth therein. The teeth may be configured to create a specific water flow pattern (e.g., as shown in FIG. 11, etc.) by providing a structure at which the water outputted from the stream straightener 300 can be guided from. Additionally or alternatively, the teeth may slow down water flow out of the stream straightener 300 by having a smaller area relative to a cavity within the stream straightener 300. The linear profile of the stream straightener 300 corresponds to the specific water flow. As can be appreciated, the water flow pattern may correlate to the profile of the stream straightener 300 and, as such, the water flow pattern may have a substantially linear profile. In other embodiments, the stream straightener 300 may have any geometrical configuration that corresponds to many water flow profiles.

Figure 10A:
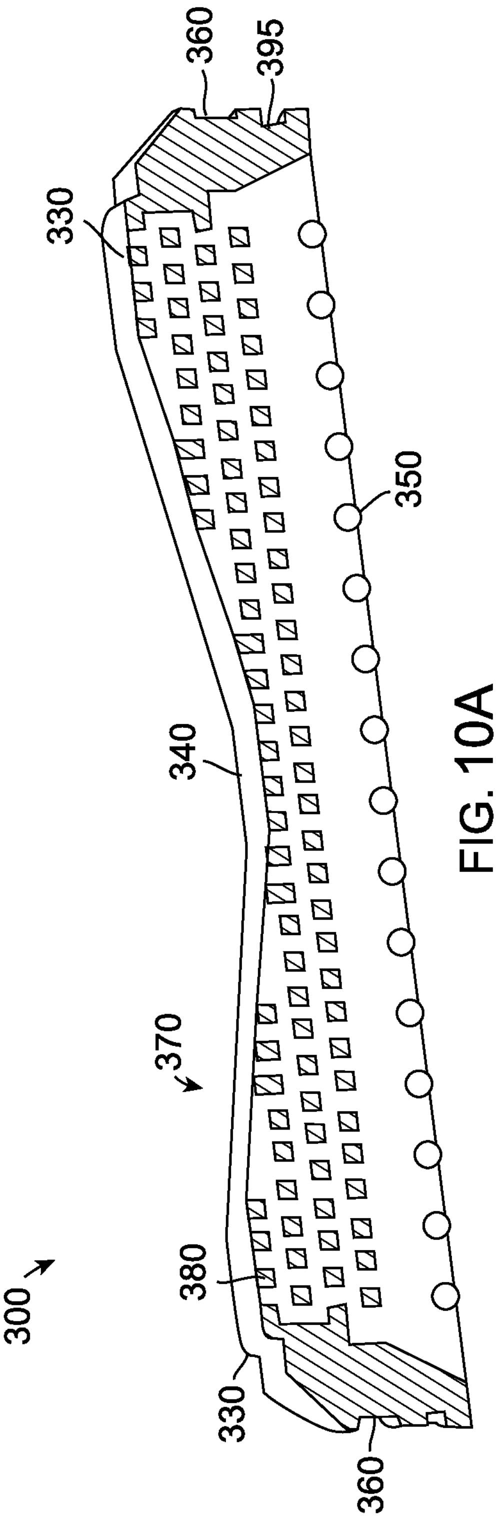
FIG. 10A is a cross-section view of the stream straightener of FIG. 8, according to an exemplary embodiment.
Figure 10B:
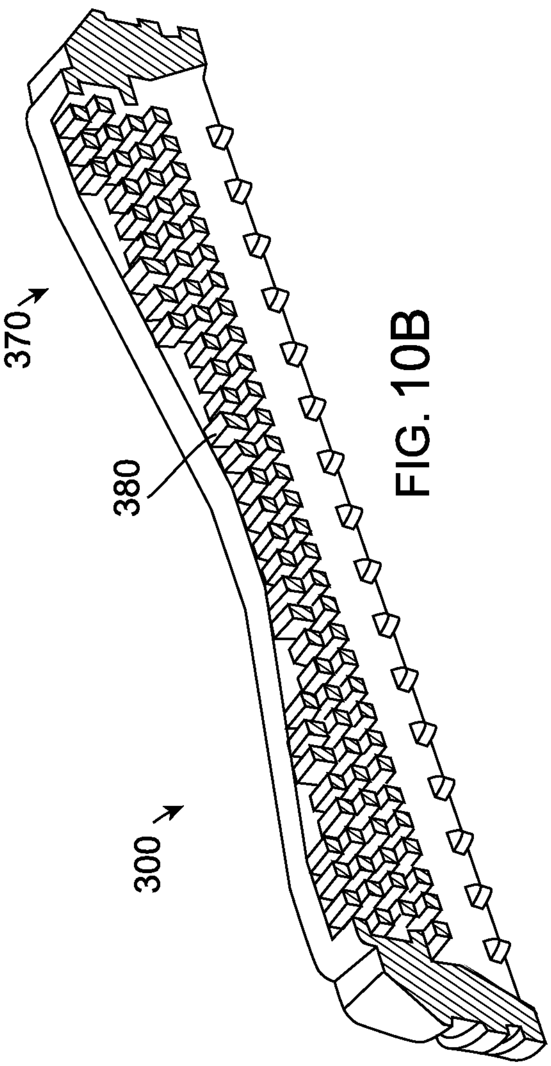
FIG. 10B is a cross-section view of the stream straightener of FIG. 8, according to an exemplary embodiment.

Referring now to FIGS. 10A and 10B, the stream straightener 300 may include one or more planar structures, shown as structure 370 (e.g., shown by way of example to include planar rows of closely spaced ribs 380, with the planar rows of ribs 380 arranged in a stacked, vertically-spaced, and offset arrangement). The structure 370 may be an internal structure extending within the stream straightener 300. By way of example, the structure 370 may extend between sidewalls within the stream straightener 300. In other embodiments, the structure 370 may extend partially between the sidewalls. The structure 370 may be configured to slow the flow of water through the stream straightener 300 by providing one or more flow obstructions internal the stream straightener 300. For example, the water may be deflected and/or separated by one of more ribs, protrusions, etc., shown as ribs 380. The ribs 380 may extend between the sidewalls of the stream straightener 300. The ribs 380 are shown as having a rectangular cross section, although alternate geometrical cross sections can be contemplated (e.g., circular, prismatic, triangular, frustoconical, etc.). The structure 370 may include one or more rows of ribs 380. The rows of ribs 380 may be positioned along at least a portion of the stream straightener 300 in a generally vertical orientation. In one example, the rows of ribs 380 may be positioned along a portion of the stream straightener 300 (e.g., a portion of a height of the stream straightener 300, etc.). In another example, the rows of ribs 380 may be positioned along the entire stream straightener 300. In another example, the rows of ribs 380 may be positioned along a portion of the stream straightener height (e.g., quarter the height, half the height, etc.). The rows of ribs 380 may be planar rows that are positioned in a staggered relationship relative to one another, where the rows of ribs 380 are configured to obstruct the flow of water within the stream straightener 300.

The rows of ribs 380 may be positioned offset one another. For example, the ribs 380 for adjacent rows may be positioned offset where a grid protrusion in a first row is positioned substantially in between a first and second grid protrusion in a second row. Accordingly, a third row of grid protrusions may be positioned substantially similar to the first row of grid protrusions. In other embodiments, the rows of ribs 380 may be linearly positioned in respect to one another. In still other embodiments, the rows of ribs 380 may not be provided in any specific arrangement or orientation. The rows of ribs 380 may be configured to obstruct the flow of water through the stream straightener 300. The rows of ribs 380 are positioned offset from one another, where the water is continuously being obstructed and diverted from the rows of ribs 380 to provide a more uniform water distribution within the stream straightener 300. As can be appreciated, the rows of ribs 380 may be provided in a different arrangement or spaced apart at a different distance to create varying flow patterns.

Referring still to FIGS. 10A and 10B, the stream straightener 300 may be removably coupled to the body 120 to assemble the faucet 100. In other embodiments, the stream straightener 300 may be assembled into the body 120 by an alternative method (e.g., fastener, locking mechanism, etc.). The stream straightener 300 may further include a removal feature 395. The removal feature 395 may be a slot provided around a perimeter of the stream straightener 300. In other embodiments, the removal feature 395 may be a series of slots that are provided opposite to one another along the stream straightener 300. In still other embodiments, the removal feature 395 may be a protrusion extending outward from the stream straightener 300. The removal feature 395 may be positioned proximate the stream straightener outlet 350, where the user can easily access the removal feature 395. In other embodiments, the removal feature 395 may be positioned distal the stream straightener outlet 350. The user may interface with the removal feature 395 (e.g., provide a force onto the removal feature 395 using a tool or portion of the user's body, etc.) to remove the stream straightener 300 from the body 120. For example, the user may use a tool to engage, or otherwise position within, the removal feature 395, where the user can provide a force onto the removal feature 395 (e.g., pry force, upward force, etc.) to remove the stream straightener 300.

Referring now to FIG. 11, the faucet 100 may include one or more slots, shown as slot 398. The slot 398 may be positioned on an underside of the faucet 100, where the tool may be received within to access the removal feature 395. In one example, the slot 398 may define a depth substantially equivalent to a depth of the removal feature 395. In another example, the slot 398 may define a depth greater than a depth of the removal feature 395. As can be appreciated, the faucet 100 may include two slots 398, positioned on opposite sides of one another and directed towards the stream straightener 300. In other embodiments, the faucet 100 may include more than two slots 398. To remove the stream straightener 300, the user may interface with at least one of the slots 398. In another example, to remove the stream straightener 300, the user may interface with both slots 398 at the same time.

Figure 12:
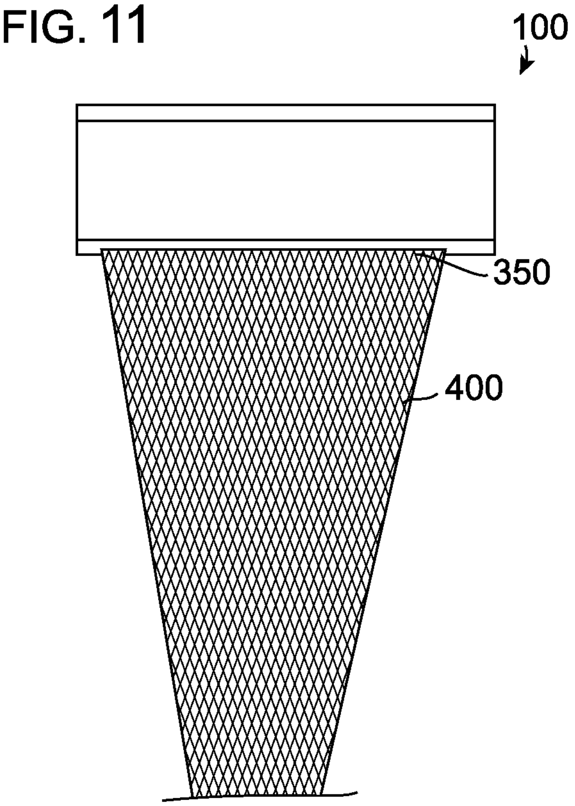
FIG. 12 is a perspective view of a water flow produced from the faucet of FIG. 1, according to an exemplary embodiment.
Figure 13:
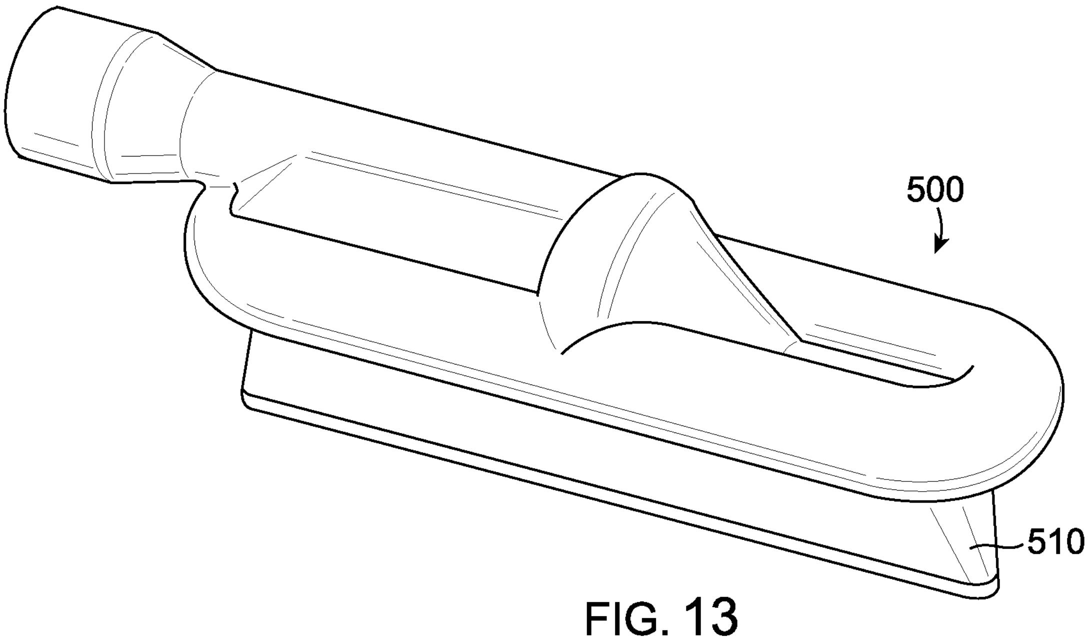
FIG. 13 is a perspective view of a waterway assembly for a faucet assembly, according to an exemplary embodiment.
Figure 14:
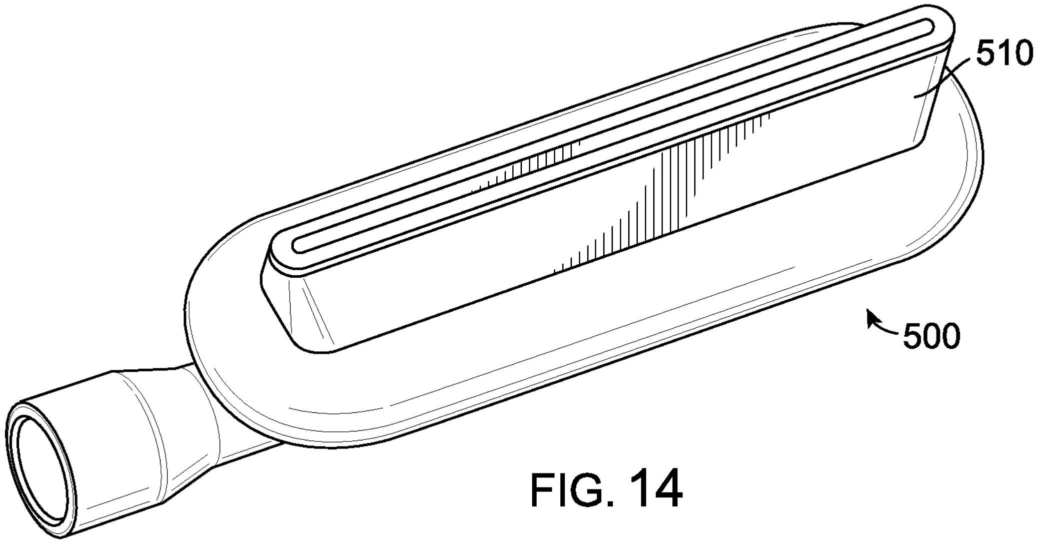
FIG. 14 is another perspective view of the waterway assembly of FIG. 13, according to an exemplary embodiment.

Referring now to FIG. 12, an example water flow 400 produced from the stream straightener 300 is shown. As shown, the water flow 400 produced from the stream straightener 300 forms a linear, grid pattern, where ends of the water flow 400 converge below the faucet 110. As the water is travels through the rows of ribs 380 and is emitted from the stream straightener, a cross-hatching pattern is developed creating a crystal-like appearance through the flowstream, Traditionally, fast water flow directs water outward from the faucet 110, in an uncontrolled pattern. As can be appreciated, the grid pattern 370 and the stream straightener outlet 350 may slow down the water flow out of the faucet 110 to increase control of the flow pattern. Accordingly, the slower water converges below the faucet 110 to create the pattern shown in FIG. 12. In one example embodiment, the water flow 400 may maintain a grid pattern within a length of 5 to 10 inches from the stream straightener outlet 350. According to an example embodiment, the water flow 400 may maintain the grid pattern for a length of 7 inches from the stream straightener outlet 350. Although, alternate flow patterns may be produced from the stream straightener 300. As can be appreciated, the stream straightener 300 and the flow pattern may take on any geometrical configuration that would be advantageous to create a unique flow pattern (e.g., cylindrical, trapezoidal, prismatic, etc.). For example, the stream straightener 300 may have a generally cylindrical structure, where the flow pattern produced from the stream straightener 300 may also have a generally cylindrical flow pattern.

Figure 15:
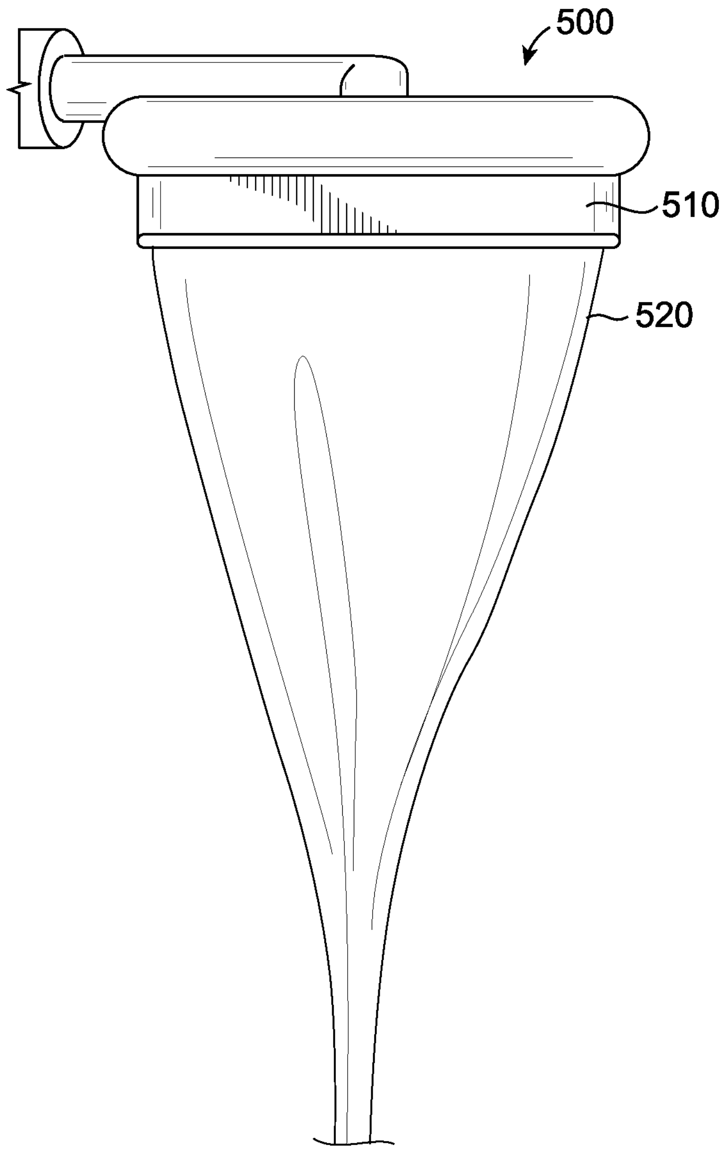
FIG. 15 is a perspective view of a water flow produced from the waterway assembly of FIG. 13, according to an exemplary embodiment.
Figure 16:
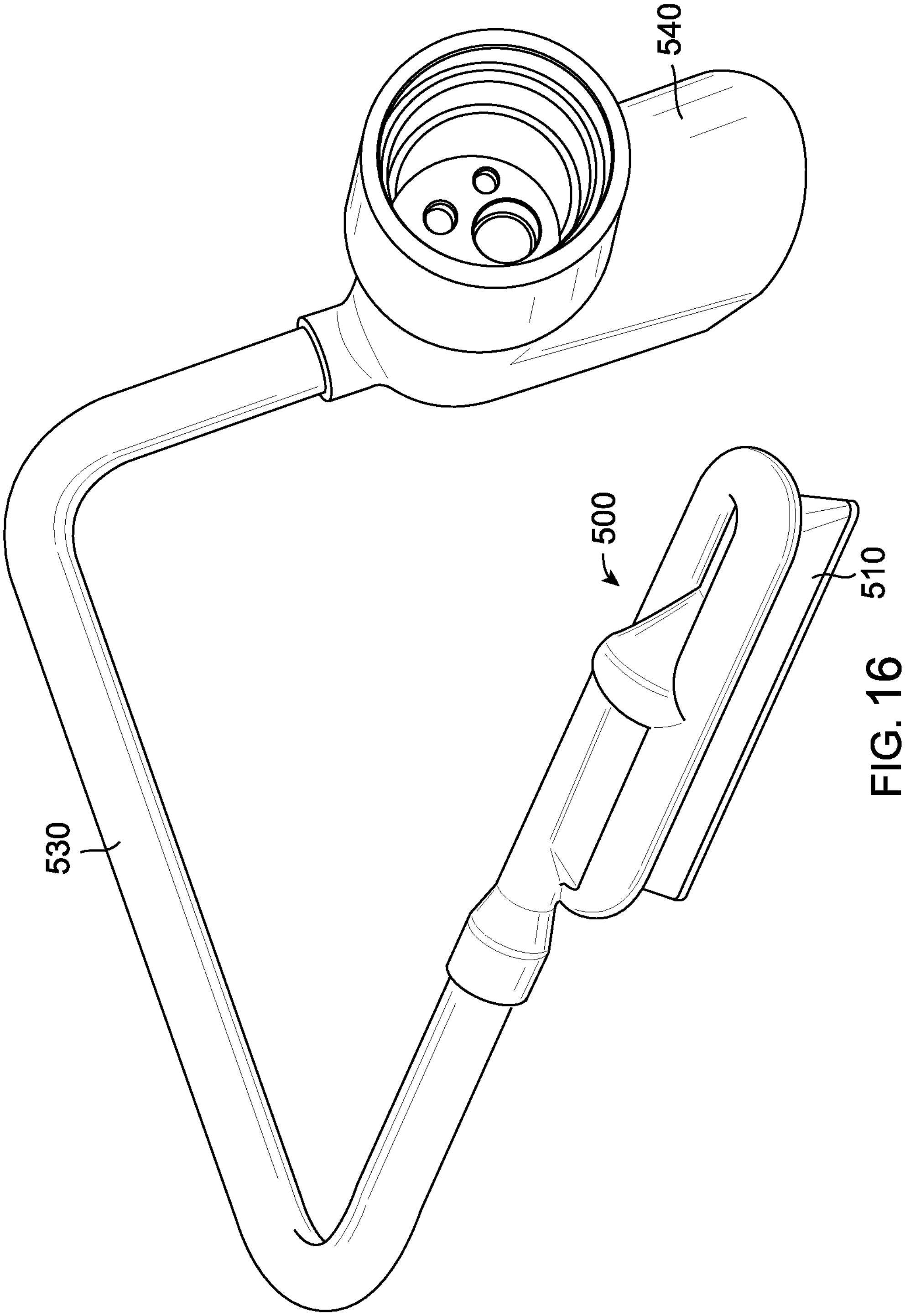
FIG. 16 is a perspective view of a faucet assembly, according to an exemplary embodiment.
Figure 17:
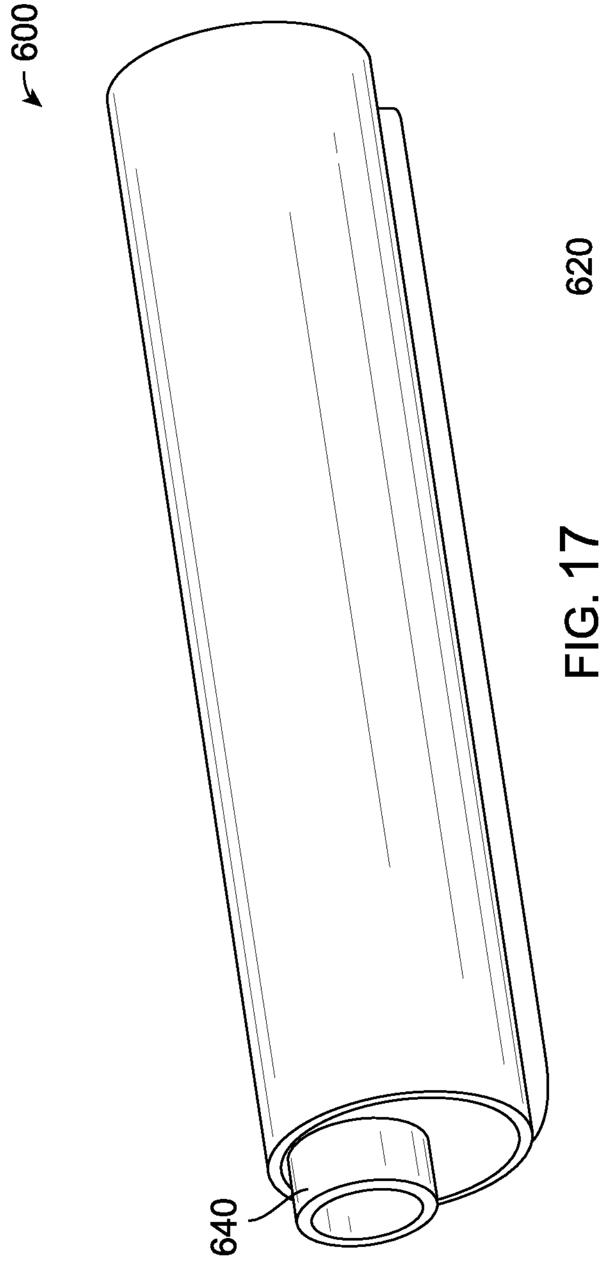
FIG. 17 is a perspective view of a waterway assembly for a faucet assembly, according to an exemplary embodiment.
Figure 18:
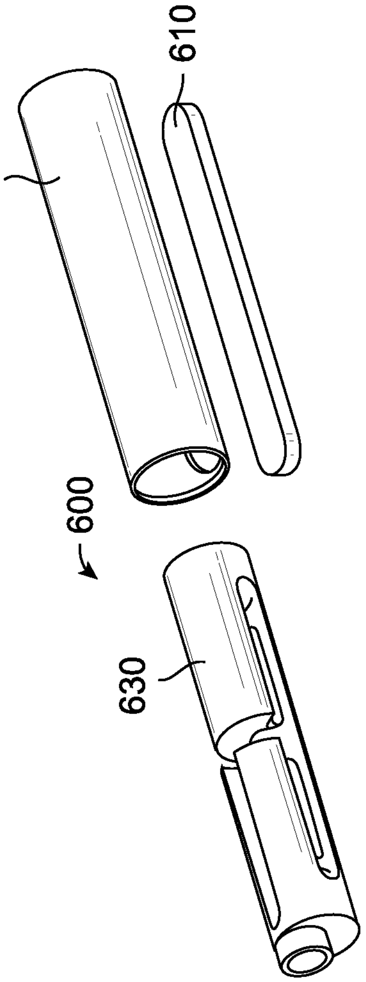
FIG. 18 is an exploded view of the waterway assembly of FIG. 17, according to an exemplary embodiment.

Referring now to FIGS. 13-16, the faucet 110 may include a waterway assembly 500, according to another exemplary embodiment. The waterway assembly 500 may be substantially similar to the waterway assembly 200 described previously. In some embodiments, the waterway assembly 500 may be isolated from the faucet 110. The waterway assembly 500 may be 3D printed. The stream straightener 510 may be substantially similar to the stream straightener 300. The stream straightener 510 may be integrally formed with the waterway assembly 500. FIG. 15 shows an example water flow 520 produced from the stream straightener 510. The water flow 520 produced from the stream straightener 510 may be substantially similar to the water flow 400. As shown in FIG. 15, the water flow 520 produced from the stream straightener 510 may form a linear, grid pattern, where ends of the water flow 520 converge below the waterway assembly 500. Although, alternate flow patterns may be produced from the stream straightener 510. FIG. 16 shows that the waterway assembly 500 may be coupled to a tube 530 which may be coupled to a body 540. According to some embodiments, the tube may be made from copper, stainless steel, or any other suitable material, and the body 540 may be a brass body.

Figure 19:
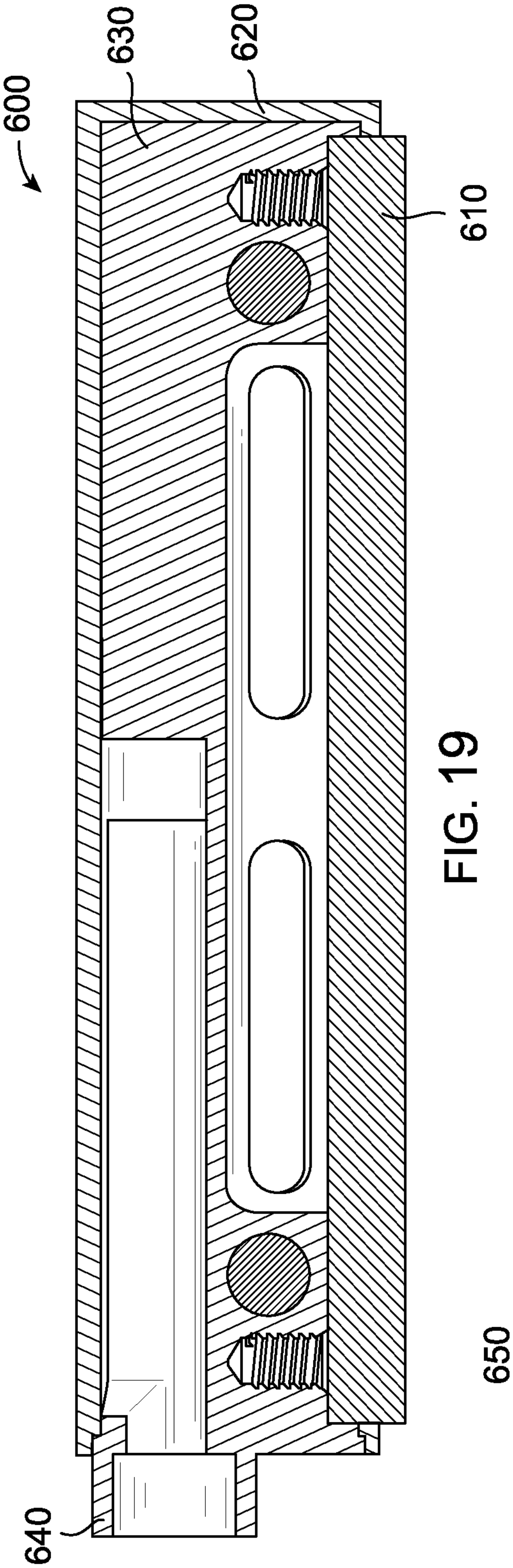
FIG. 19 is a cross-sectional view of the waterway assembly of FIG. 17, according to an exemplary embodiment.
Figure 21:
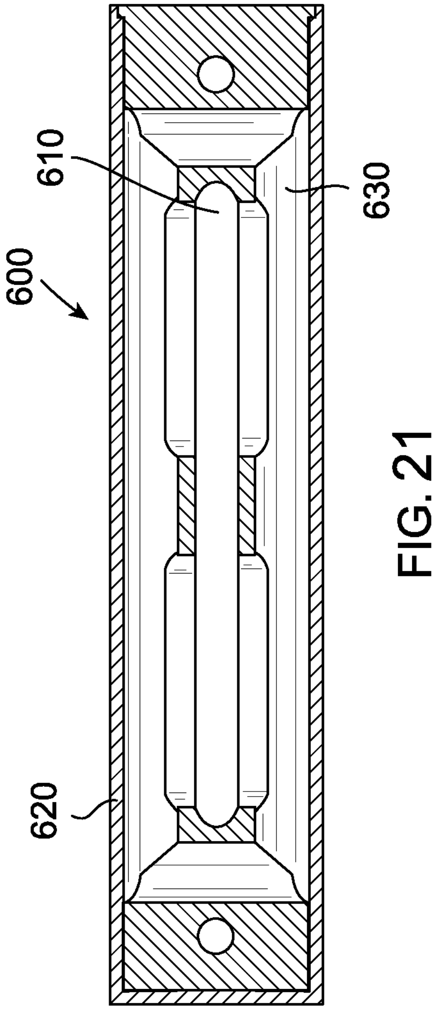
FIG. 21 is a bottom view of the waterway assembly of FIG. 17, according to an exemplary embodiment.
Figure 20:
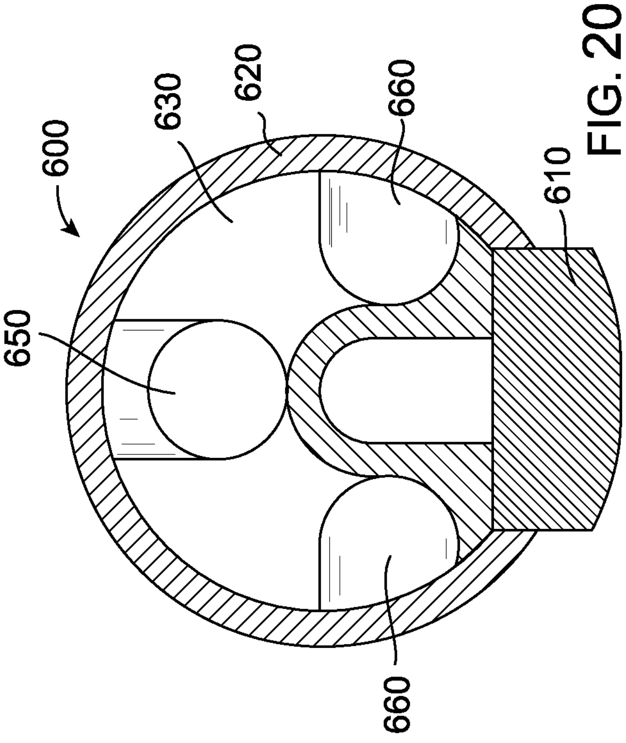
FIG. 20 is a detailed rear view of the waterway assembly of FIG. 17, according to an exemplary embodiment.
Figure 22:
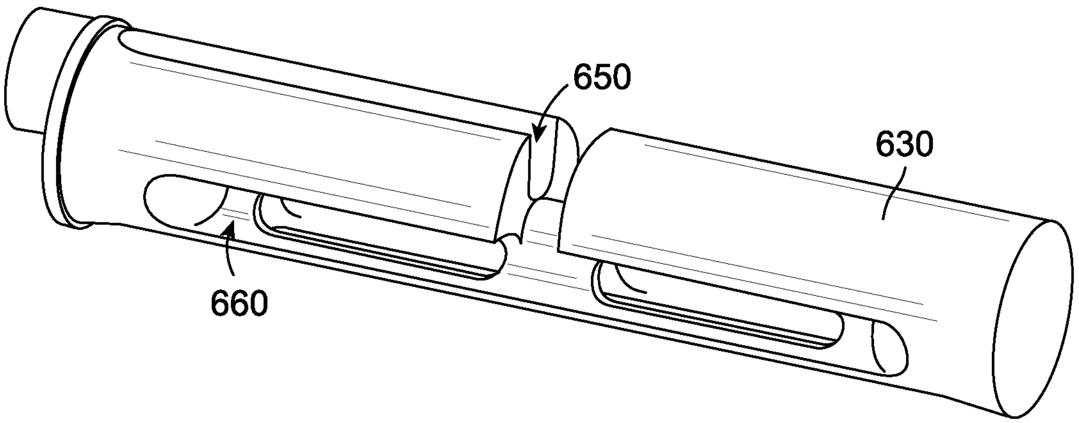
FIG. 22 is a perspective view of a waterway of the waterway assembly of FIG. 17, according to an exemplary embodiment.
Figure 23:
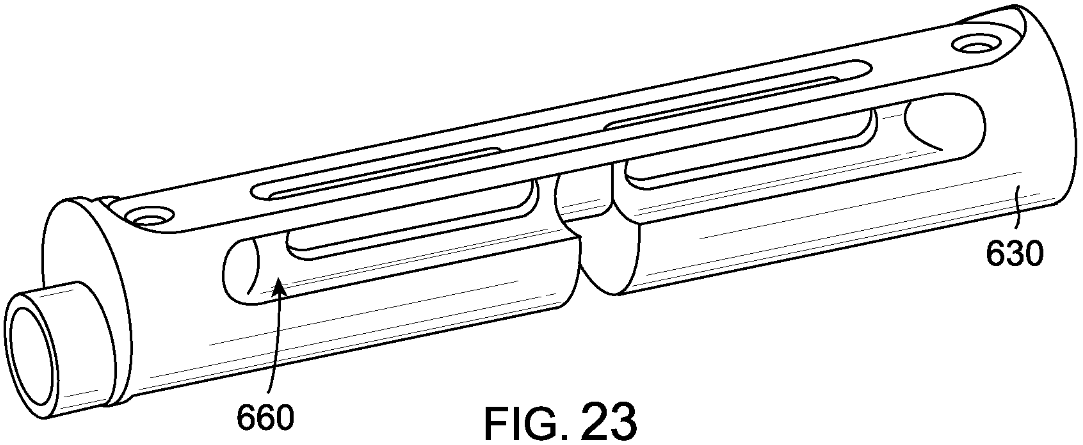
FIG. 23 is another perspective view of the waterway of the waterway assembly of FIG. 17, according to an exemplary embodiment.
Figure 24:
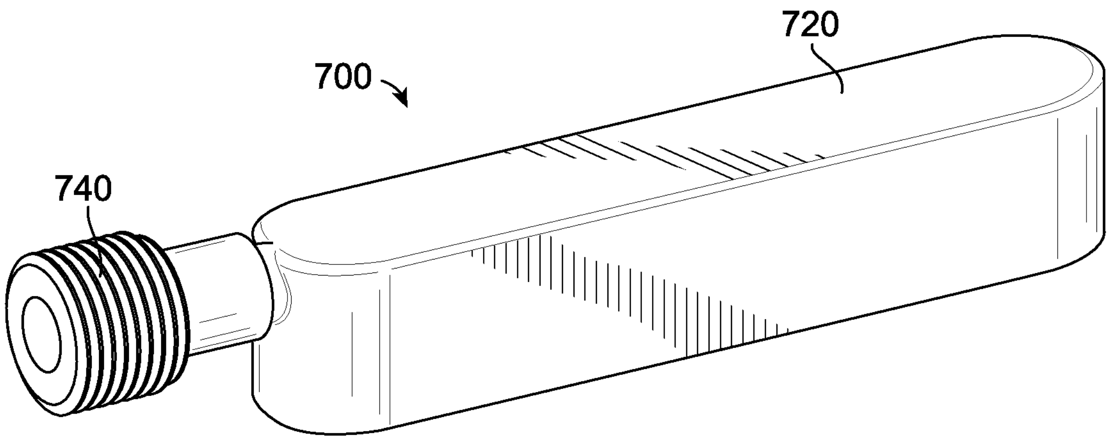
FIG. 24 is a perspective view of a waterway assembly for a faucet assembly, according to an exemplary embodiment.
Figure 25:
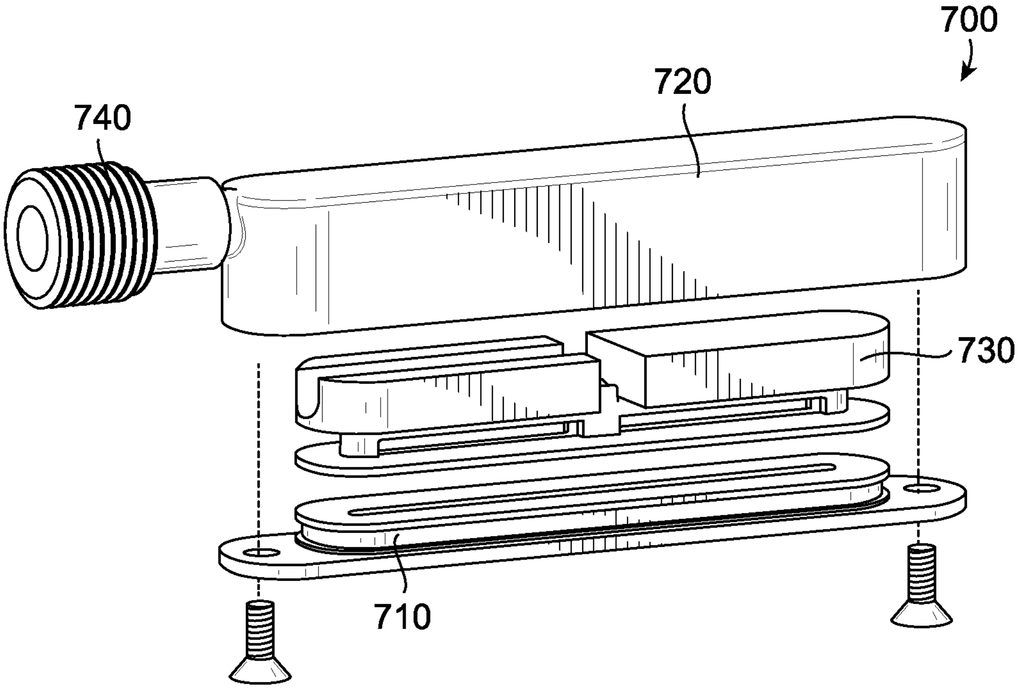
FIG. 25 is an exploded view of the waterway assembly of FIG. 24, according to an exemplary embodiment.

Referring now to FIGS. 17-23, the faucet 110 may include a waterway assembly 600, formed from a material such as brass in a casting process and/or machined according to another exemplary embodiment. The waterway assembly 600 may be substantially similar to the waterway assembly 200 described previously. The waterway assembly 600 may have a connector 640 configured to connect the waterway assembly 600 to the faucet 110. The connector 640 may be configured for brazing, fastening, etc. In some embodiments, the waterway assembly 600 may be isolated from the faucet 110. The waterway assembly 600 may be machined from brass. The waterway assembly 600 may include a stream straightener 610, a waterway housing 620, and a waterway 630. The waterway housing 620 may be coupled to the waterway 630 and the stream straightener 610. The stream straightener 610 may be substantially similar to the stream straightener 300 described previously. As shown in FIG. 19, the stream straightener 610 may be coupled to the waterway housing 620 using at least one fastener (e.g. screw, bolt, etc.). Additionally or alternatively, the stream straightener 610 may be integrally formed with the waterway housing 620. The stream straightener 610 may be made from plastic or brass. FIGS. 22-23 show the waterway 630. The waterway 630 may form a first waterway 650 and a second waterway 660 that may be substantially similar to the first waterway 210 and the second waterway 220 as described previously. The waterway 630 may also form first openings and second openings that may be substantially similar to the first openings 250 and second openings 260 as described previously. Water may flow from the first waterway 650 to the second waterway 660 in a direction substantially downward.

Figure 26:
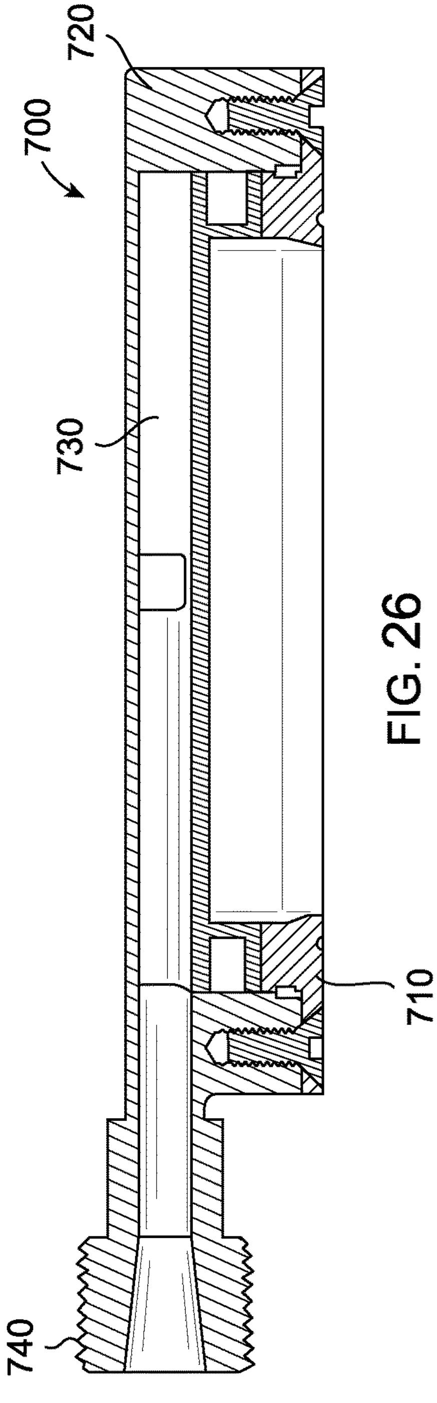
FIG. 26 is a cross-sectional view of the waterway assembly of FIG. 24, according to an exemplary embodiment.
Figure 28:
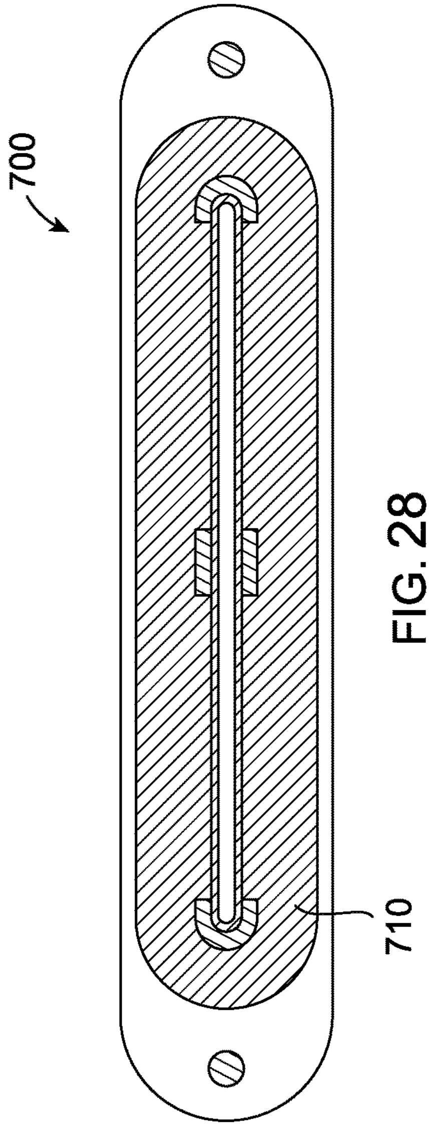
FIG. 28 is a bottom view of the waterway assembly of FIG. 24, according to an exemplary embodiment.
Figure 27:
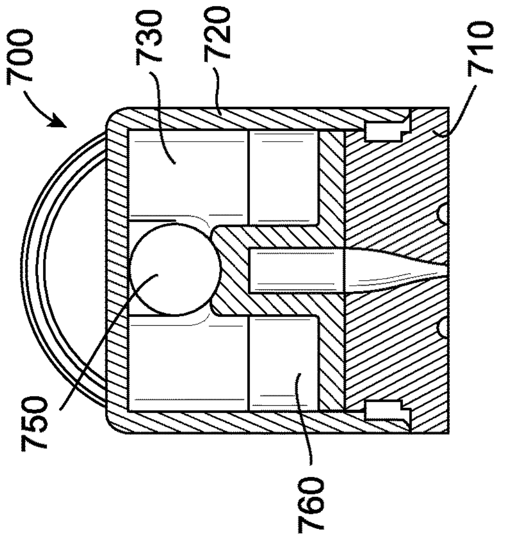
FIG. 27 is a rear view of the waterway assembly of FIG. 24, according to an exemplary embodiment.
Figure 29:
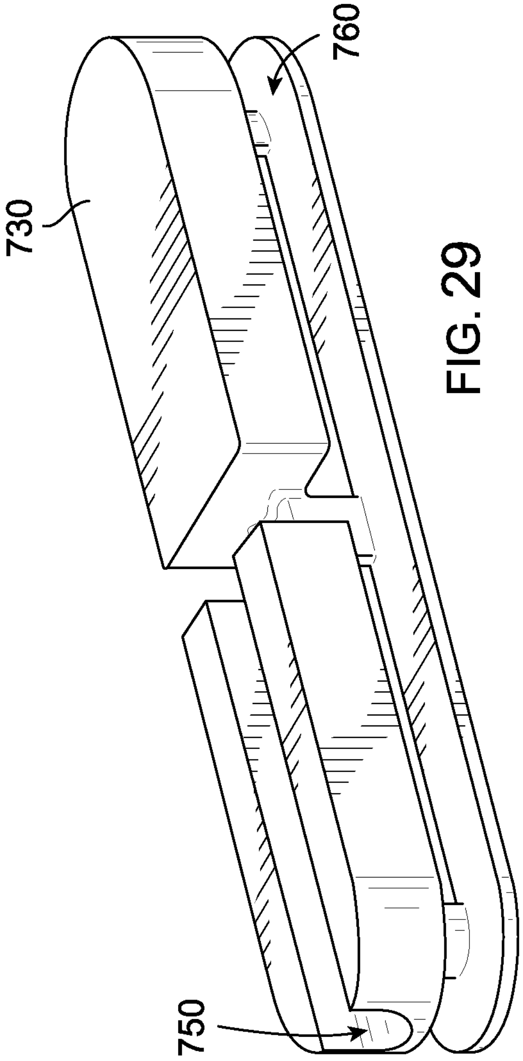
FIG. 29 is a perspective view of a waterway of the waterway assembly of FIG. 24, according to an exemplary embodiment.
Figure 30:
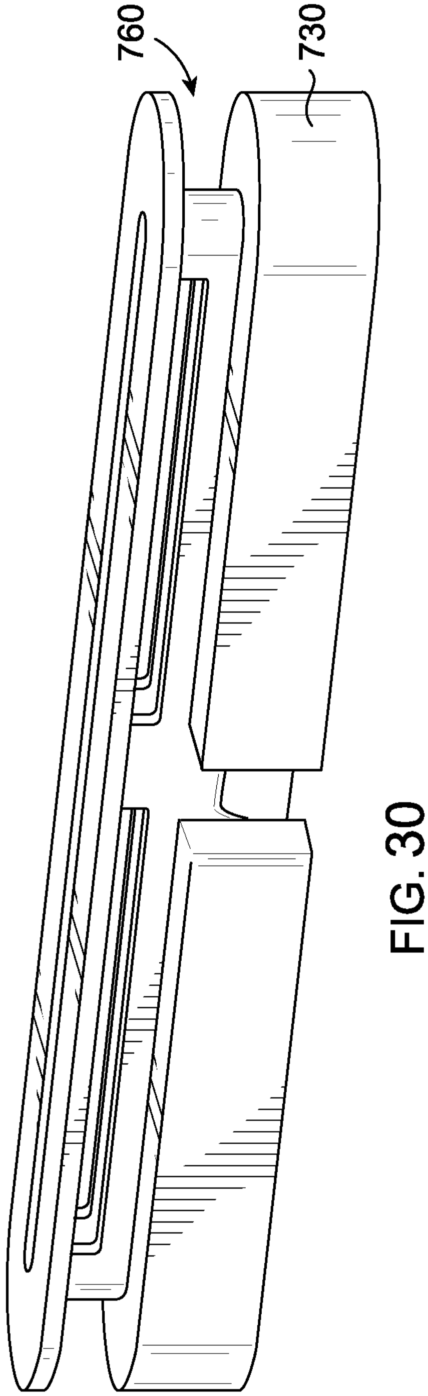
FIG. 30 is another perspective view of the waterway of the waterway assembly of FIG. 24, according to an exemplary embodiment.

Referring now to FIGS. 24-30, the faucet 110 may include a waterway assembly 700, with a stream straightener that is formed from injection molded plastic, according to another exemplary embodiment. The waterway assembly 700 may be substantially similar to the waterway assembly 200 described previously. The waterway assembly 700 may have a connector 740 configured to connect the waterway assembly 700 to the faucet 110. The connector 740 may be configured for brazing, fastening, etc. In some embodiments, the waterway assembly 700 may be isolated from the faucet 110. The waterway assembly 700 including the stream straightener 710 may be made from plastic and formed in an injection molding process. The waterway assembly 700 may include a stream straightener 710, a waterway housing 720, and a waterway 730. The waterway housing 720 may be coupled to the waterway 630 and the stream straightener 710. The stream straightener 710 may be substantially similar to the stream straightener 300 described previously. As shown in FIG. 26, the stream straightener 710 may be coupled to the waterway housing 720 using at least one fastener (e.g. screw, bolt, etc.). Additionally or alternatively, the stream straightener 710 may be integrally formed with the waterway housing 720. The stream straightener 710 may be made from plastic or brass. FIGS. 29-30 show the waterway 730. The waterway 730 may form a first waterway 750 and a second waterway 760 that may be substantially similar to the first waterway 210 and the second waterway 220 as described previously. The waterway 730 may also form first openings and second openings that may be substantially similar to the first openings 250 and second openings 260 as described previously. Water may flow from the first waterway 750 to the second waterway 760 in a direction substantially downward.

As utilized herein with respect to numerical ranges, the terms "approximately," "relative to," "substantially," and similar terms generally mean+/−10% of the disclosed values, unless specified otherwise. As utilized herein with respect to structural features (e.g., to describe shape, size, orientation, direction, relative position, etc.), the terms "approximately," "relative to," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

What is claimed is:

1. A waterway for a fluid delivery device, comprising:

a body;

an inlet passage formed in the body and configured to receive a supply of water;

a continuous header passage formed in the body as a loop with elongated side passages, the inlet passage arranged above the continuous header passage such that at least a portion of the elongated side passages are positioned underneath the inlet passage;

a connector passage formed in the body and fluidly interconnecting the inlet passage and the elongated side passages of the continuous header passage;

a chamber formed in the body in spaced relation to the elongated side passages; and a plurality of ports formed in the body and extending between the elongated side passages and the chamber.

2. The waterway of claim 1, further comprising a stream straightener comprising a plurality of parallel ribs formed in the body and fluidly communicating with the chamber and configured to discharge a stream of the water from the fluid delivery device.

3. The waterway of claim 1, further comprising a stream straightener comprising a plurality of parallel ribs releasably coupled to the body and fluidly communicating with the chamber and configured to discharge a stream of the water from the fluid delivery device.

4. The waterway of claim 1, wherein the elongated side passages are two parallel elongated side passages, and further comprising two semicircular end passages at opposite ends of the two parallel elongated side passages.

5. The waterway of claim 1, wherein the elongated side passages comprise a first elongated side passage and a second elongated side passage arranged opposite the first elongated side passage, wherein the connector passage comprises a first passage extending between the inlet passage and a central region of the first elongated side passage of the loop, and a second passage extending between the inlet passage and a central region of the second elongated side passage of the loop.

6. The waterway of claim 1, wherein the chamber is spaced equidistantly between the elongated side passages.

7. The waterway of claim 1, wherein the plurality of ports comprise four elongated ports symmetrically arranged between the elongated side passages and the chamber.

8. The waterway of claim 1, wherein the body is 3D printed.

9. The waterway of claim 1, wherein the body is machined from brass.

10. A water delivery device, comprising:

a waterway comprising:

a body;

an inlet passage formed in the body and configured to receive a supply of water;

a continuous header passage formed in the body as a loop with elongated side passages, the inlet passage arranged above the continuous header passage such that at least a portion of the elongated side passages are positioned underneath the inlet passage;

a connector passage formed in the body and fluidly interconnecting the inlet passage and the elongated side passages of the continuous header passage;

a chamber formed in the body in spaced relation to the elongated side passages; and a plurality of ports formed in the body and extending between the elongated side passages and the chamber; and a stream straightener.

11. The water delivery device of claim 10, wherein the stream straightener comprises a plurality of parallel ribs formed in the body and fluidly communicating with the chamber and configured to discharge a stream of the water from the water delivery device.

12. The water delivery device of claim 10, wherein the stream straightener comprises a plurality of parallel ribs releasably coupled to the body and fluidly communicating with the chamber and configured to discharge a stream of the water from the water delivery device.

13. The water delivery device of claim 10, wherein the elongated side passages are two parallel elongated side passages, and further comprising two semicircular end passages at opposite ends of the two parallel elongated side passages.

14. The water delivery device of claim 10, wherein the elongated side passages comprise a first elongated side passage and a second elongated side passage arranged opposite the first elongated side passage, wherein the connector passage comprises a first passage extending between the inlet passage and a central region of the first elongated side passage of the loop, and a second passage extending between the inlet passage and a central region of the second elongated side passage of the loop.

15. The water delivery device of claim 10, wherein the chamber is spaced equidistantly between the elongated side passages.

16. The water delivery device of claim 10, wherein the plurality of ports comprise four elongated ports symmetrically arranged between the elongated side passages and the chamber.

17. The water delivery device of claim 10, wherein the body is 3D printed.

18. The water delivery device of claim 10, wherein the body is machined from brass.

19. A faucet assembly comprising:

a faucet;

a body;

a waterway assembly comprising:

a first waterway configured to direct fluid in at least a first flow direction; and a second waterway in an elongated oval or ellipse configuration having elongated side passages, the first waterway arranged above the second waterway such that at least a portion of the elongated side passages are positioned underneath the first waterway, the second waterway configured to direct fluid in at least a second flow direction and to provide a uniform fluid distribution and pressure within the second waterway; and a stream straightener coupled to the body and configured to direct fluid flow to create a flow pattern.

20. The faucet assembly of claim 19, wherein the stream straightener comprises a plurality of parallel ribs formed in the body and fluidly communicating with a chamber and configured to discharge a stream of water from the faucet.

* * * * *